(12) United States Patent
Matsuo

(10) Patent No.: US 8,958,029 B2
(45) Date of Patent: Feb. 17, 2015

(54) LIQUID CRYSTAL DISPLAY DEVICE

(75) Inventor: Shinji Matsuo, Kumagaya (JP)

(73) Assignee: Kabushiki Kaisha Toshiba, Tokyo (JP)

(*) Notice: Subject to any disclaimer, the term of this patent is extended or adjusted under 35 U.S.C. 154(b) by 8 days.

(21) Appl. No.: 13/313,796

(22) Filed: Dec. 7, 2011

(65) Prior Publication Data

US 2012/0200803 A1    Aug. 9, 2012

(30) Foreign Application Priority Data

Feb. 4, 2011   (JP) ................................. 2011-023368

(51) Int. Cl.
*G02F 1/1335* (2006.01)
*F21V 8/00* (2006.01)

(52) U.S. Cl.
CPC ............ *G02B 6/0046* (2013.01); *G02B 6/0088* (2013.01); *G02B 6/0091* (2013.01)
USPC .............................. 349/65; 362/615; 362/628

(58) Field of Classification Search
CPC ................................................ G02F 1/133615
USPC ............................................. 349/65; 362/615
See application file for complete search history.

(56) References Cited

U.S. PATENT DOCUMENTS

2004/0114345 A1* 6/2004 Kim et al. .................... 362/31
2010/0220497 A1* 9/2010 Ngai ............................ 362/610

FOREIGN PATENT DOCUMENTS

| EP | 0520623 | * 10/1997 |
|---|---|---|
| JP | 06-102414 | 4/1994 |
| JP | 2001-167622 | 6/2001 |
| JP | 2001-202817 | 7/2001 |
| JP | 2003-281924 | 10/2003 |
| JP | 2004-193135 | 7/2004 |
| JP | 2004-302296 | 10/2004 |
| WO | WO 2004-081444 | 9/2004 |

OTHER PUBLICATIONS

Translation of Detailed Description of JP2001167622.*
Translation of Detailed Description of JP 2002150823.*
(Continued)

*Primary Examiner* — Richard Kim
*Assistant Examiner* — Kendrick Hsu
(74) *Attorney, Agent, or Firm* — Blakely, Sokoloff, Taylor & Zafman LLP

(57) ABSTRACT

According to one embodiment, a liquid crystal display device includes a liquid crystal cell, light source devices and a light guide plate. The light guide plate applies, to a rear surface of the liquid crystal cell, light beams from the light source devices. The light guide plate includes a first light input portion at a first-shorter-side side surface and a second light input portion at a second-shorter-side side surface. The light guide plate includes a flat first surface opposed to the rear surface and a second surface opposite to the first surface. The second surface includes a first slant surface inclined so that a thickness of the light guide plate decreases as a position goes from the first-shorter-side side surface to an approximately central portion and a second slant surface inclined so that the thickness decreases as a position goes from the second-shorter-side side surface to the approximately central portion.

22 Claims, 11 Drawing Sheets

(56) References Cited

OTHER PUBLICATIONS

Japanese Patent Application No. 2011-023368; Notification of Reasons for Refusal; Mailed Mar. 6, 2012 (with English translation).

Japanese Patent Application No. 2011-023368; Notification of Reasons for Refusal; Mailed May 29, 2012 (with English translation).

* cited by examiner

LIQUID CRYSTAL DISPLAY DEVICE

CROSS REFERENCE TO RELATED APPLICATION(S)

This application is based upon and claims the benefit of priority from Japanese Patent Application No. 2011-023368 filed on Feb. 4, 2011, the entire contents of which are incorporated herein by reference.

FIELD

Embodiments described herein relate to a liquid crystal display device.

BACKGROUND

In recent years, flat display devices such as liquid crystal display devices have come to be used widely as image display devices of TV receivers, various computers, etc. because of their advantages that they are low in thickness, weight, and power consumption.

For example, transmissive liquid crystal display devices are equipped with a liquid crystal panel in which a liquid crystal layer is held between a pair of transparent substrates and a surface light source device which is disposed behind the liquid crystal panel (i.e., on the side opposite to an image display screen) and applies light to the liquid crystal panel.

To further reduce the thickness and the size of such liquid crystal display devices, it is necessary to decrease the thickness of the surface light source device further. To this end, side light type (edge light type) surface light source devices (backlights) have come to be employed more than direct light type ones.

Side light type surface light source devices have a linear light source and a thin-plate-shaped light guide plate which is made of an acrylic resin or the like and whose back surface is printed with a scattering pattern. The linear light source is disposed close to one side surface of the light guide plate. Light emitted from the linear light source travels through the light guide plate, is scattered by the scattering pattern of the back surface of the light guide plate, and exits from the liquid-crystal-panel-side main surface of the light guide plate.

Surface light source devices of liquid crystal display devices are increasingly required to be increased in size and decreased in thickness to accommodate size increase and thickness reduction of TV receivers. However, when the size of a surface light source device is increased, it is difficult to maintain its luminance and luminance uniformity and hence to decrease its thickness.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

DETAILED DESCRIPTION

In general, according to one embodiment, a liquid crystal display device includes a transmissive liquid crystal cell, a plurality of light source devices, and a light guide plate. The transmissive liquid crystal cell includes a substantially rectangular, flat-plate-like external shape. Each of the light source devices includes a plurality of light-emitting elements arranged in a row. The light guide plate is configured to apply, to a rear surface of the liquid crystal cell, light beams that originate from the light source devices. The light guide plate includes a substantially rectangular, plate-like external shape with a first-shorter-side side surface and a second-shorter-side side surface. The light guide plate includes a first light input portion at the first-shorter-side side surface on which light coming from one light source device enters and a second light input portion at the second-shorter-side side surface on which light coming from another light source device enters. The light guide plate includes a first surface opposed to the rear surface of the liquid crystal cell and a second surface opposite to the first surface. The first surface is a flat surface. The second surface includes a first slant surface and a second slant surface. The first slant surface being inclined so that a thickness of the light guide plate decreases as a position goes from the first-shorter-side side surface to an approximately central portion of the light guide plate. The second slant surface being inclined so that the thickness of the light guide plate decreases as a position goes from the second-shorter-side side surface to the approximately central portion of the light guide plate.

Embodiments will be hereinafter described with reference to the drawings.

(Embodiment 1)

Figure 1:
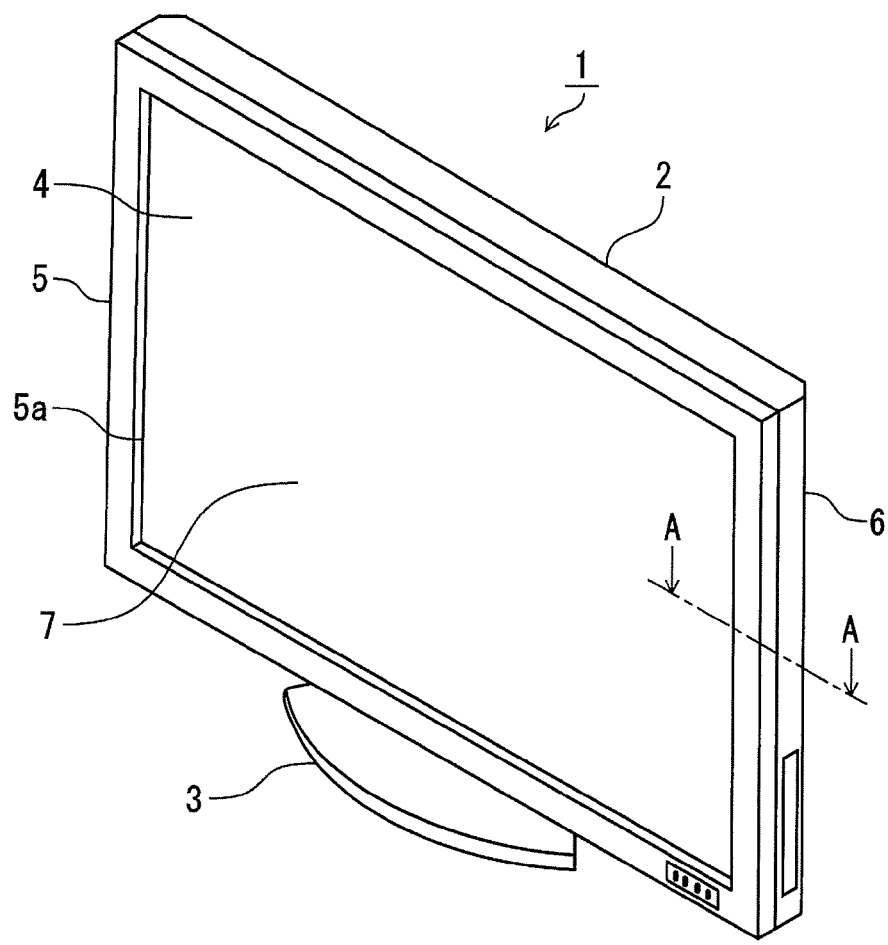
FIG. 1 is an exemplary perspective view showing a general appearance of a liquid crystal display device according to a first embodiment.

FIG. 1 is a perspective view showing a general appearance of a liquid crystal display device 1 according to a first embodiment. The liquid crystal display device 1 is equipped with a cabinet 2 and a stand 3 which supports the cabinet 2. A liquid crystal module 4 is disposed in the cabinet 2 on the front side, and a chassis (not shown) which supports the liquid crystal module 4 is also disposed in the cabinet 2 behind the liquid crystal module 4. The chassis is mounted with a video control circuit board (not shown) for driving the liquid crystal module 4 and a power circuit board (not shown).

The outside surfaces of the cabinet 2 are enclosed by a front panel 5 which covers the front surface, and parts of the top surface, the bottom surface and both side surfaces of the cabinet 2 and a rear panel 6 which covers the rear surface, and the other parts of the top surface, the bottom surface and both side surfaces of the cabinet 2. A screen 7 is a display portion, located inside a window portion 5a of the front panel 5, of the liquid crystal module 4.

Figure 2:
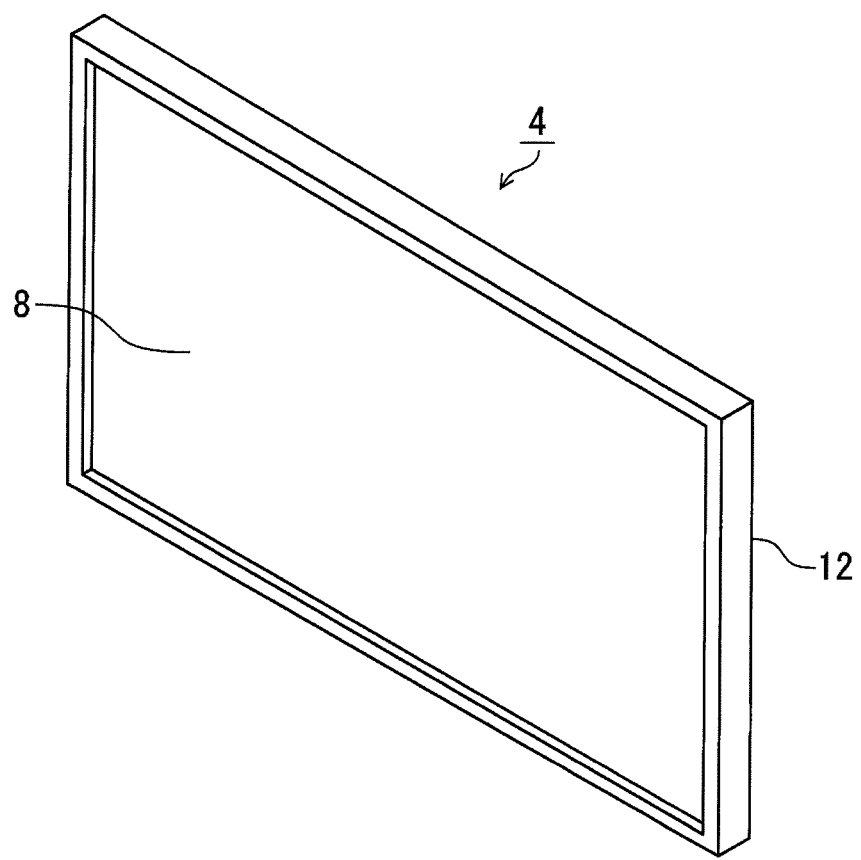
FIG. 2 is an exemplary perspective view showing a general appearance of a liquid crystal module according to the first embodiment.
Figure 3:
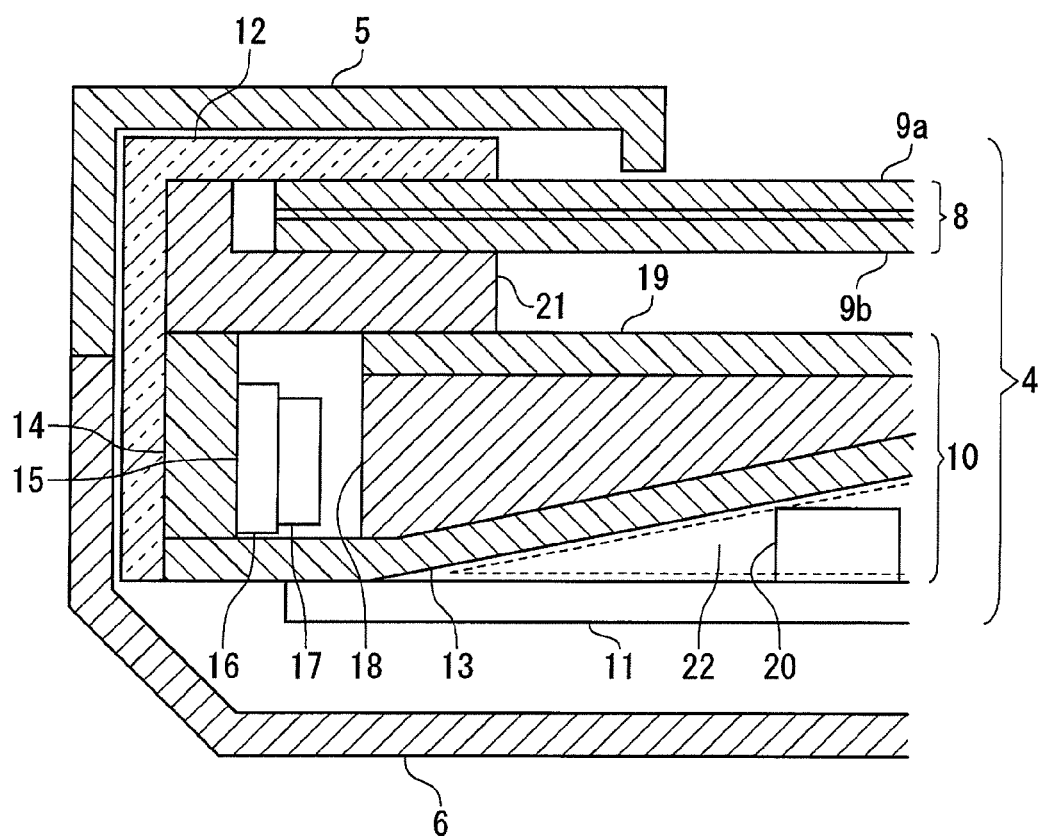
FIG. 3 is an exemplary partial sectional view of the liquid crystal display device according to the first embodiment.

FIG. 2 is a perspective view showing a general appearance of the liquid crystal module 4 according to the first embodiment. FIG. 3 is a partial sectional view of the liquid crystal display device 1 according to the first embodiment taken along line A-A in FIG. 1. In the part shown in FIG. 3, the liquid crystal module 4 is composed of a liquid crystal cell 8, a backlight unit 10, a circuit board 11, a front cover 12, and a spacer 21.

The liquid crystal cell 8 is a transmissive liquid crystal panel having a substantially rectangular, flat-plate-like external shape. The liquid crystal cell 8 has a flat structure in which the space between at least two substrates 9a and 9b made of glass or the like is filled with a liquid crystal substance. The interval between the substrates 9a and 9b is usually several micrometers.

The backlight unit 10 is composed of a back cover 13, a frame 14, a light source device 15, a light guide plate 18, and a diffusion plate 19. The back cover 13 is produced by sheet metal forming or resin molding. The light guide plate 18 and the frame 17 are attached to the back cover 13. The back cover 13 and the front cover 12 function as a cabinet of the liquid crystal module 4.

The frame 14 is a frame member produced by resin molding, aluminum extrusion molding, or the like. The light source device 15 is a circuit board in which light-emitting elements 17 which are LEDs (light-emitting diodes), for example, are mounted on a light-emitting elements wiring board 16.

The light guide plate 18 has a substantially rectangular, plate-like external shape and is approximately the same as the liquid crystal cell 8 in external size. The light guide plate 18 is a transparent acrylic plate or polycarbonate plate. The light guide plate 18 is configured so that light beams that are emitted from the light-emitting elements 17 and enter the light guide plate 18 through a side surface are reflected inside repeatedly and output from the entire surface (first surface) that is opposed to the rear surface of the liquid crystal cell 8. As such, the light guide plate 18 applies light that originates from the light source device 15 to the rear surface of the liquid crystal cell 8.

The diffusion plate 19 is placed on the light exit surface of the light guide plate 18. The diffusion plate 19 is an optical member which serves to adjust the traveling directions of light that is output from the light guide plate 18 and to diffuse that light so that the light enters on the rear surface of the liquid crystal cell 8 uniformly.

A reflection plate may be disposed between the light guide plate 18 and the back cover 13. The surface, opposed to the light guide plate 18, of the back cover 13 may be coated with a reflective material. Alternatively, the surface, opposed to the back cover 13, of the light guide plate 18 may be coated with a reflective material.

The circuit board 11 is provided with mounted components for driving the liquid crystal cell 8 and the light source device 15, and is connected to the liquid crystal cell 8 and the light source device 15 by flexible boards or cables (not shown). The circuit board 11 is disposed behind the back cover 13.

The spacer 21 has roles of adjusting the interval between the diffusion plate 19 and the liquid crystal cell 8 and to position the liquid crystal cell 8 and the backlight unit 10. The front cover 12 is a metal cover having an opening that is approximately the same in shape as the display area of the liquid crystal cell 8. The front cover 12 and the back cover 13 constitute a cabinet of the liquid crystal module 4. The liquid crystal module 4 is configured in such a manner that the frame 14, the spacer 21, the light guide plate 18, and the liquid crystal cell 8 are fixed being sandwiched between the front cover 12 and the back cover 13.

Figure 4:
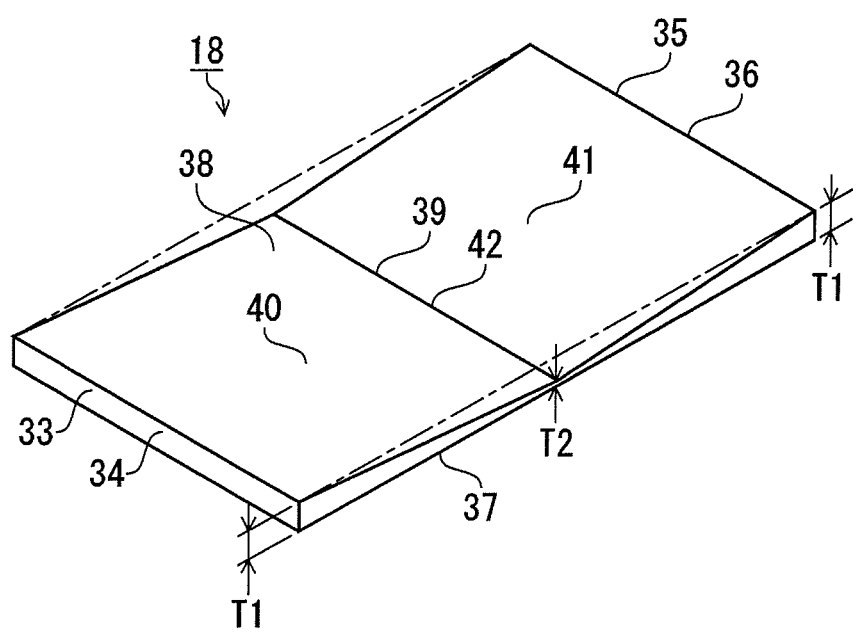
FIG. 4 is an exemplary perspective view showing a general appearance of a light guide plate according to the first embodiment.

FIG. 4 is a perspective view showing a general appearance of the light guide plate 18 used in the first embodiment. The light guide plate 18 has a substantially rectangular, plate-like external shape and is approximately the same as the liquid crystal cell 8 in external size. In the light guide plate 18, a first-shorter-side side surface 33 is a first light input portion 34 on which light coming from one light source device 15 enters and a second-shorter-side side surface 35 is a second light input portion 36 on which light coming from the other light source device 15 enters. As such, the light guide plate 18 applies, to the rear surface of the liquid crystal cell 8, light beams that originate from the light source devices 15.

A first surface 37, opposed to the rear surface of the liquid crystal cell 8, of the light guide plate 18 is a flat surface. A second surface 38 that is opposite to the first surface 37 is formed by a first slant surface 40 which is inclined to such a direction that the thickness T of the light guide plate 18 decreases from T1 to T2 as the position goes from the first-shorter-side side surface 33 to an approximately central portion 39 of the light guide plate 18 and a second slant surface 41 which is inclined to such a direction that the thickness T of the light guide plate 18 decreases from T1 to T2 as the position goes from the second-shorter-side side surface 35 to the approximately central portion 39 of the light guide plate 18.

Figure 5:
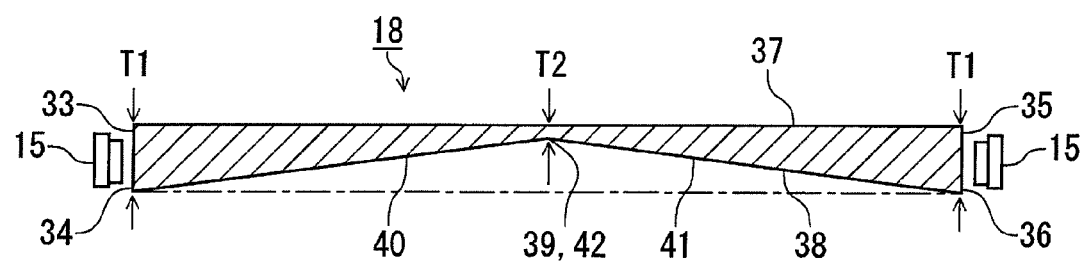
FIG. 5 is an exemplary sectional view of the liquid guide plate according to the first embodiment.

FIG. 5 is a sectional view of the light guide plate 18 used in the first embodiment. In the cross section, the light guide plate 18 is approximately symmetrical with respect to the approximately central portion 39. The light guide plate 18 has the thickness T1 at both shorter-side side surfaces 33 and 35 and has the thickness T2 at the approximately central portion 39. For example, the thicknesses T1 and T2 are about 4 mm and about 1 mm, respectively. The light source devices 15 are disposed in the vicinities of the respective shorter-side side surfaces 33 and 35, and light beams emitted from the light source devices 15 enter the light guide plate 18 through the first light input portion 34 and the second light input portion 36, respectively.

The first slant surface 40 and the second slant surface 41 are connected to each other smoothly by a connection portion 42 which is shaped like a circular arc in a sectional view. This is because if the connection portion of the first slant surface 40 and the second slant surface 41 were like a ridge line of a triangular prism, the manner of light output would become discontinuous at the portion corresponding to the connection portion to shed a linear shadow on the liquid crystal cell 8. For example, the radius of curvature of the circular arc of the connection portion is about 5 to 10 mm.

As shown in FIG. 3, the back cover 13 conforms to the second surface 38 of the light guide plate 18 and a triangular-prism-shaped space 22 (indicated by a broken line) is formed behind the back cover 13. The mounted components 20 of the circuit board 11 are disposed in this space 22, whereby the circuit board 11 can be disposed closer to the back cover 13 and the liquid crystal module 4 can thereby be made thinner. Since the second surface 38 of the light guide plate 18 is inclined, the paths of light beams are made shorter than in the case without slant surfaces, as a result of which a luminance increase of 4% to 5%, for example, can be realized.

As described above, the arrangement space of the circuit board 11 for driving the liquid crystal cell 8 and the light source devices 15 can be secured without degrading the optical characteristics such as luminance and luminance uniformity of the side light type back light unit 10. The liquid crystal module 4 can thus be reduced in thickness.

(Embodiment 2)

Figure 6:
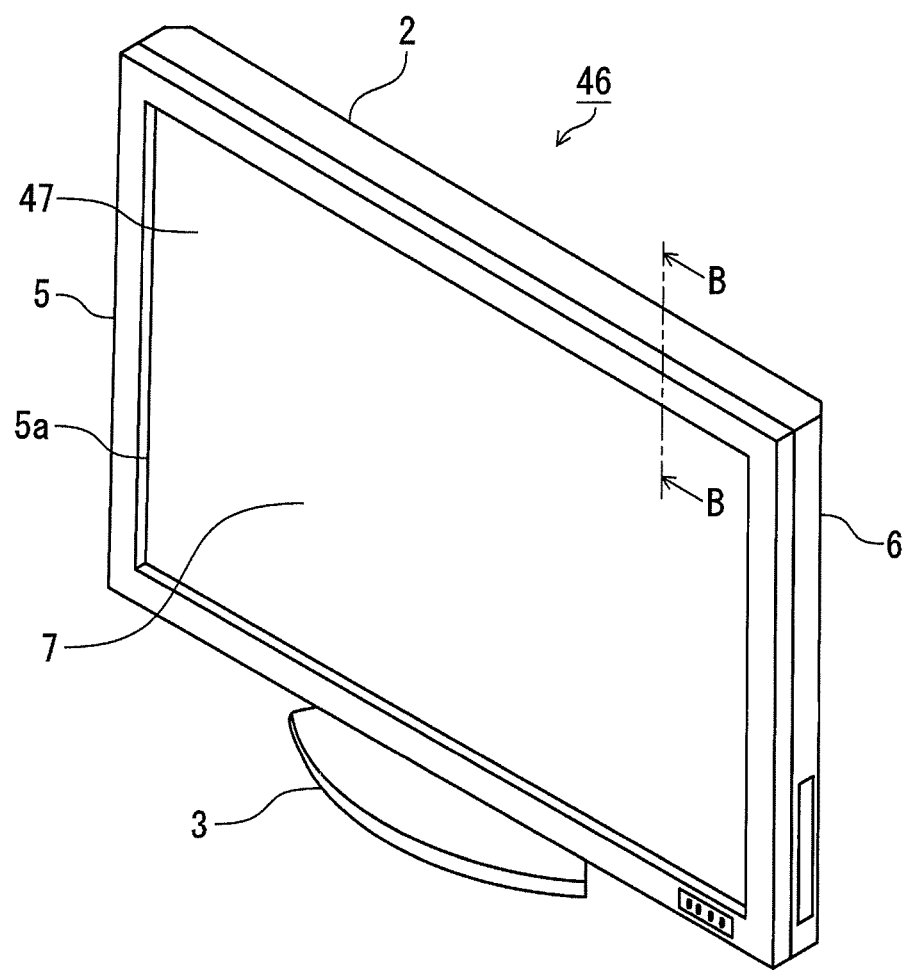
FIG. 6 is an exemplary perspective view showing a general appearance of a liquid crystal display device according to a second embodiment.
Figure 7:
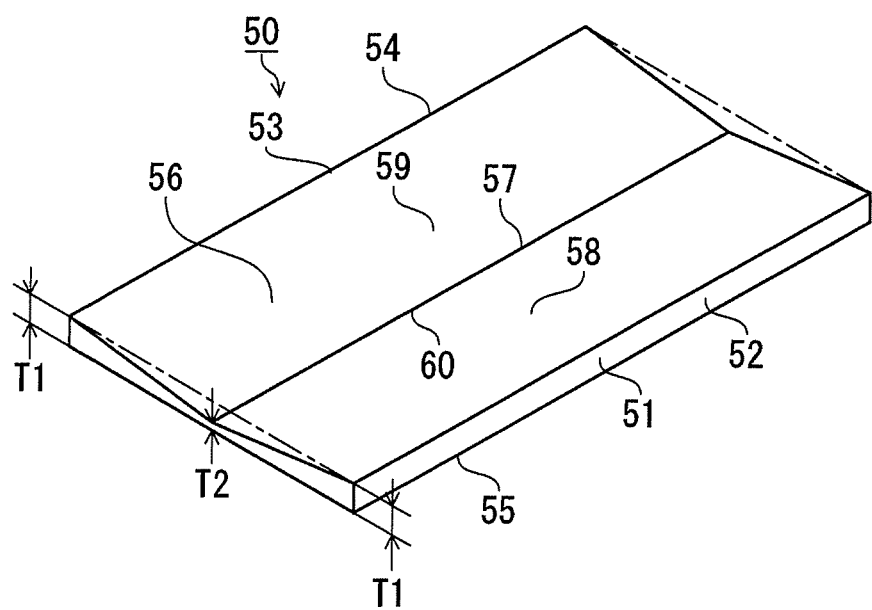
FIG. 7 is an exemplary perspective view showing a general appearance of a light guide plate according to the second embodiment.
Figure 8:
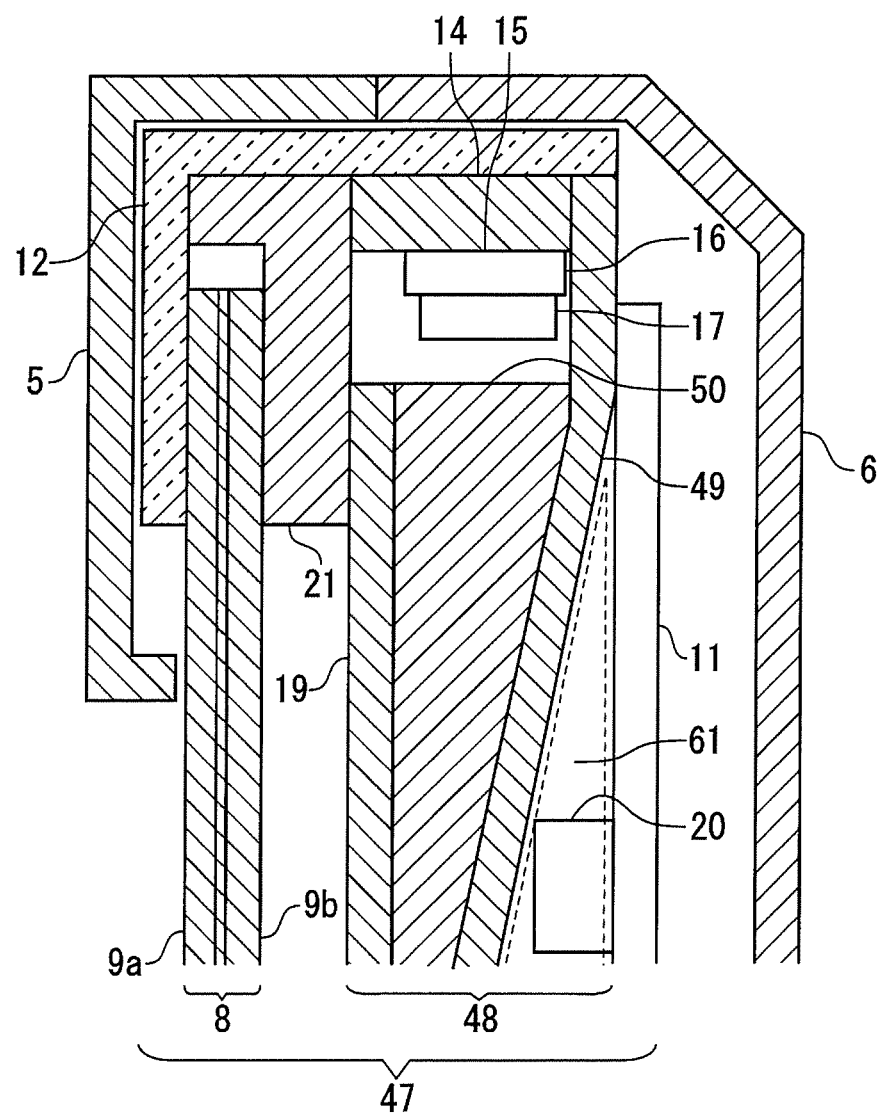
FIG. 8 is an exemplary partial sectional view of the liquid crystal display device according to the second embodiment.

FIG. 6 is a perspective view showing a general appearance of a liquid crystal display device 46 according to a second embodiment. FIG. 7 is a perspective view showing a general appearance of a light guide plate 50 used in the second embodiment. FIG. 8 is a partial sectional view of the liquid crystal display device 46 according to the second embodiment taken along line B-B in FIG. 6. Members etc. of the second embodiment having the same ones in the first embodiment shown in FIGS. 1-3 will be given the same reference symbols as the latter. The second embodiment is different from the first embodiment in the following points. In the first embodiment, the light guide plate 18 has the two shorter-side side surfaces 33 and 35 serving as the respective light input portions 34 and 36 and the first slant surface 40 and the second slant surface 41 which are inclined so that the thickness T of the light guide plate 18 decreases from T1 to T2 as the position goes from each of the shorter-side side surfaces 33 and 35 to the approximately central portion 39. In contrast, in the second embodiment, the light guide plate 50 has two longer-side side surfaces 51 and 53 serving as respective light input portions 52 and 54 and a first slant surface 58 and a second slant surface 59 which are inclined so that the thickness T of the light guide plate 50 decreases from T1 to T2 as the position goes from each of the longer-side side surfaces 51 and 53 to an approximately central portion 57 of the light guide plate 50.

The light guide plate 50 has a substantially rectangular, plate-like external shape and is approximately the same as the liquid crystal cell 8 in external size. In the light guide plate 50, the first-longer-side side surface 51 is a first light input portion 52 on which light coming from one light source device 15 enters and a second-longer-side side surface 53 is a second light input portion 54 on which light coming from the other light source device 15 enters. As such, the light guide plate 50 applies, to the rear surface of the liquid crystal cell 8, light beams that originate from the light source devices 15.

A first surface 55, opposed to the rear surface of the liquid crystal cell 8, of the light guide plate 50 is a flat surface. A second surface 56 that is opposite to the first surface 55 is formed by the first slant surface 58 which is inclined so that the thickness T of the light guide plate 50 decreases from T1 to T2 as the position goes from the first-longer-side side surface 51 to the approximately central portion 57 of the light guide plate 18 and the second slant surface 59 which is inclined so that the thickness T of the light guide plate 50 decreases from T1 to T2 as the position goes from the second-longer-side side surface 53 to the approximately central portion 57 of the light guide plate 50.

The first slant surface 58 and the second slant surface 59 are connected to each other smoothly by a connection portion 60 which is shaped like a circular arc in a sectional view. This is because if the connection portion of the first slant surface 58 and the second slant surface 59 were like a ridge line of a triangular prism, the manner of light output would become discontinuous at the portion corresponding to the connection portion to shed a linear shadow on the liquid crystal cell 8. For example, the radius of curvature of the circular arc of the connection portion is about 5 to 10 mm.

As shown in FIG. 8, a back cover 49 conforms to the second surface 56 of the light guide plate 50 and a triangular-prism-shaped space 61 (indicated by a broken line) is formed behind the back cover 49. The mounted components 20 of the circuit board 11 are disposed in this space 61, whereby the circuit board 11 can be disposed closer to the back cover 49 and a liquid crystal module 47 can thereby be made thinner. Since the second surface 56 of the light guide plate 50 is inclined, the paths of light beams are made shorter than in the case without slant surfaces, as a result of which a luminance increase of 4% to 5%, for example, can be realized.

Also in the second embodiment, the arrangement space of the circuit board 11 for driving the liquid crystal cell 8 and the light source devices 15 can be secured without degrading the optical characteristics such as luminance and luminance uniformity of a side light type back light unit 48. The liquid crystal module 47 can thus be reduced in thickness.

(Embodiment 3)

Figure 9:
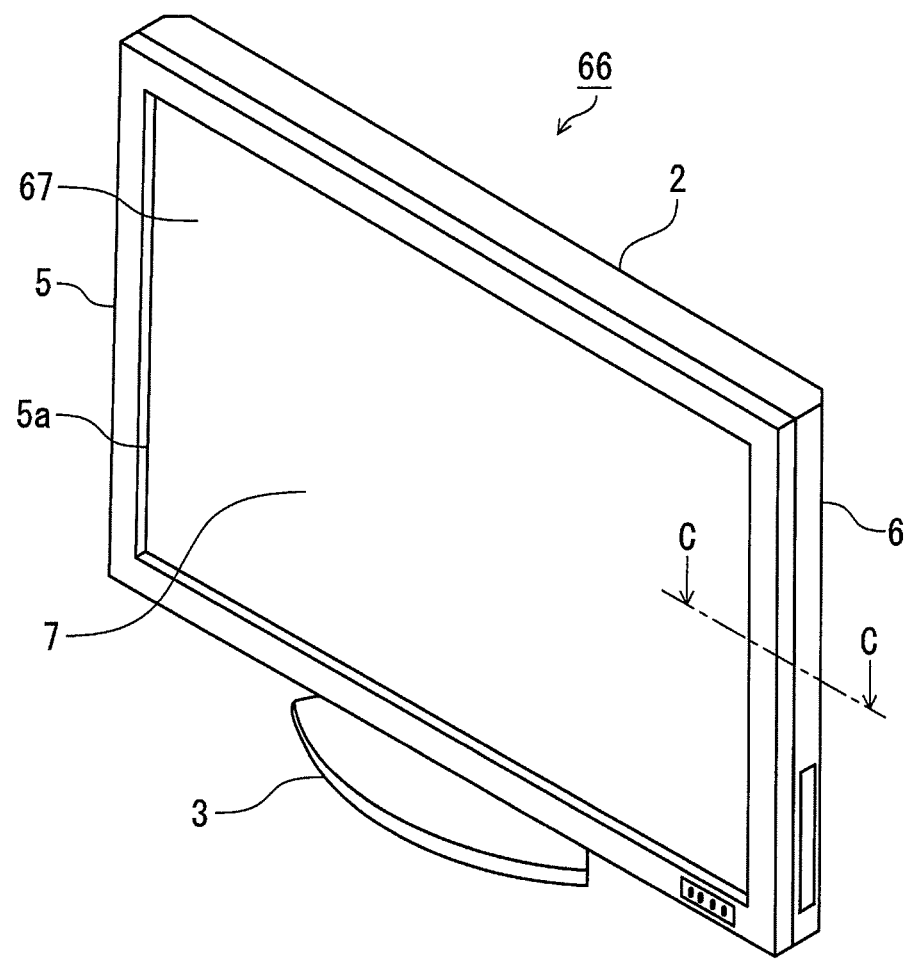
FIG. 9 is an exemplary perspective view showing a general appearance of a liquid crystal display device according to a third embodiment.
Figure 10:
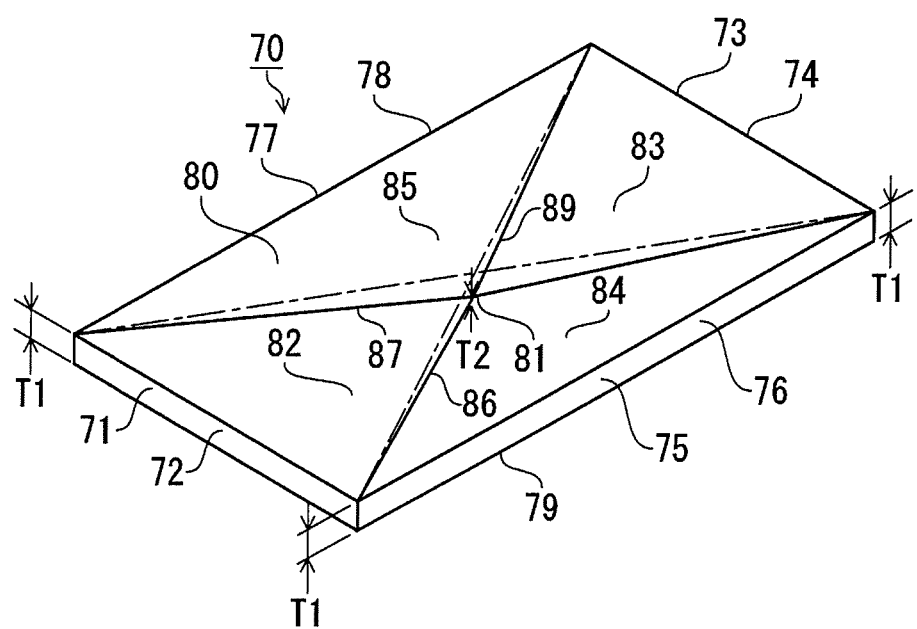
FIG. 10 is an exemplary perspective view showing a general appearance of a light guide plate according to the third embodiment.
Figure 11:
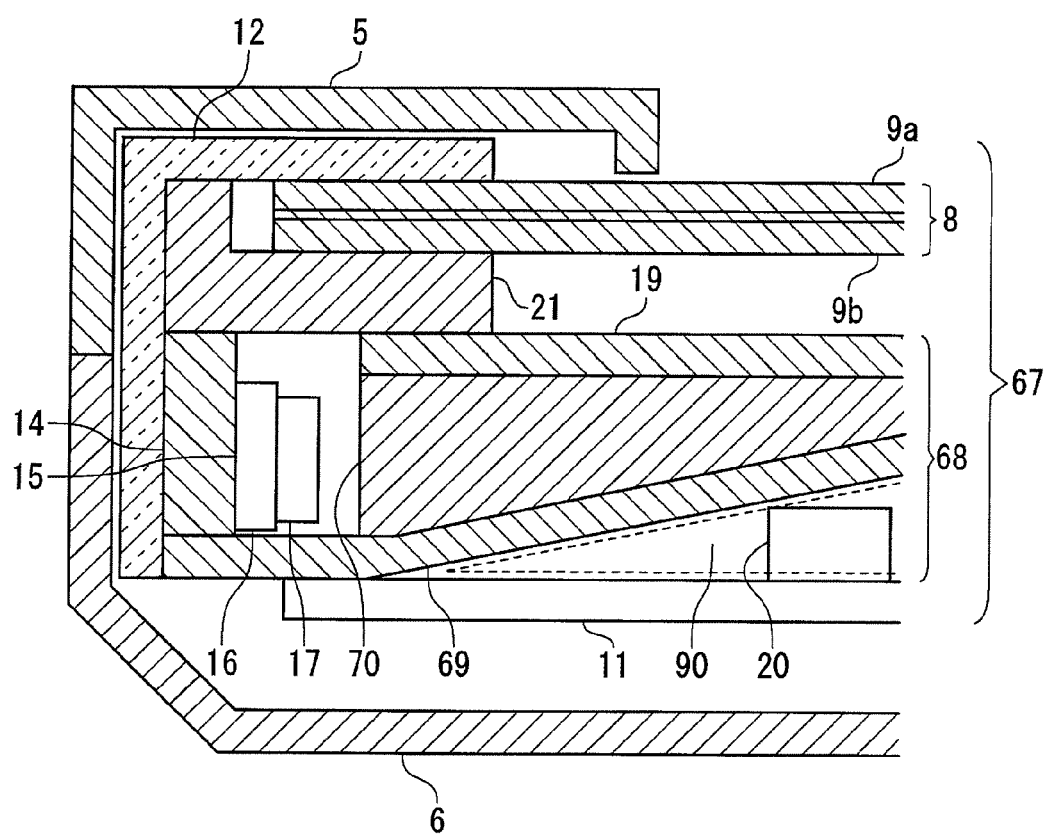
FIG. 11 is an exemplary partial sectional view of the liquid crystal display device according to the third embodiment.

FIG. 9 is a perspective view showing a general appearance of a liquid crystal display device 66 according to a third embodiment. FIG. 10 is a perspective view showing a general appearance of a light guide plate 70 used in the third embodiment. FIG. 11 is a partial sectional view of the liquid crystal display device 66 according to the third embodiment taken along line C-C in FIG. 9. Members etc. of the third embodiment having the same ones in the first embodiment shown in FIGS. 1-3 will be given the same reference symbols as the latter. The third embodiment is different from the first embodiment in the following points. In the first embodiment, the light guide plate 18 has the two shorter-side side surfaces 33 and 35 serving as the respective light input portions 34 and 36 and the first slant surface 40 and the second slant surface 41 which are inclined so that the thickness T of the light guide plate 18 decreases from T1 to T2 as the position goes from each of the shorter-side side surfaces 33 and 35 to the approximately central portion 39. In contrast, in the third embodiment, the light guide plate 70 has two shorter-side side surfaces 71 and 73 serving as respective light input portions 72 and 74 and two longer-side side surfaces 75 and 77 serving as respective light input portions 76 and 78, and a substantially triangular first slant surface 82, second slant surface 83, third slant surface 84, and fourth slant surface 85 which are inclined so that the thickness T of the light guide plate 70 decreases from T1 to T2 as the position goes from each of the shorter-side side surfaces 71 and 73 and the longer-side side surface 75 and 77 to an approximately central portion 81 of the light guide plate 70.

The light guide plate 70 has a substantially rectangular, plate-like external shape and is approximately the same as the liquid crystal cell 8 in external size. In the light guide plate 70, the first-shorter-side side surface 71 is a first light input portion 72 on which light coming from one light source device 15 enters, a second-shorter-side side surface 73 is a second light input portion 74 on which light coming from another light source device 15 enters, the first-longer-side side surface 75 is a third light input portion 76 on which light coming from another light source device 15 enters, and the second-longer-side side surface 77 is a fourth light input portion 78 on which light coming from the other light source device 15 enters. As such, the light guide plate 70 applies, to the rear surface of the liquid crystal cell 8, light beams that originate from the light source devices 15.

A first surface 79, opposed to the rear surface of the liquid crystal cell 8, of the light guide plate 70 is a flat surface. A second surface 80 that is opposite to the first surface 79 is formed by the substantially triangular first slant surface 82 which is inclined so that the thickness T of the light guide plate 70 decreases from T1 to T2 as the position goes from the first-shorter-side side surface 71 to the approximately central portion 81 of the light guide plate 70, the substantially triangular second slant surface 83 which is inclined so that the thickness T of the light guide plate 70 decreases from T1 to T2 as the position goes from the second-shorter-side side surface 73 to the approximately central portion 81 of the light guide plate 70, the substantially triangular third slant surface 84 which is inclined so that the thickness T of the light guide plate 70 decreases from T1 to T2 as the position goes from the first-longer-side side surface 75 to the approximately central portion 81 of the light guide plate 70, and the substantially triangular fourth slant surface 85 which is inclined so that the thickness T of the light guide plate 70 decreases from T1 to T2 as the position goes from the second-longer-side side surface 77 to the approximately central portion 81 of the light guide plate 70, The first slant surface 82 and the third slant surface 84 are connected to each other smoothly by a first connection portion 86 which is shaped like a circular arc in a sectional view, the first slant surface 82 and the fourth slant surface 85 are connected to each other smoothly by a second connection portion 87 which is shaped like a circular arc in a sectional view, the second slant surface 83 and the third slant surface 84 are connected to each other smoothly by a third connection portion 88 which is shaped like a circular arc in a sectional view, and the second slant surface 83 and the fourth slant surface 85 are connected to each other smoothly by a fourth connection portion 89 which is shaped like a circular arc in a sectional view.

This is because if the connection portion of adjoining slant surfaces were like a straight ridge line, the manner of light output would become discontinuous at the portion corresponding to the connection portion to shed a linear shadow on the liquid crystal cell 8. For example, the radius of curvature of the circular arc of each connection portion is about 5 to 10 mm.

As shown in FIG. 11, a back cover 69 conforms to the second surface 80 of the light guide plate 70 and a rectangular-pyramid-shaped space 90 (indicated by a broken line) is formed behind the back cover 69. The mounted components 20 of the circuit board 11 are disposed in this space 90, whereby the circuit board 11 can be disposed closer to the back cover 69 and a liquid crystal module 67 can thereby be made thinner. Since the second surface 80 of the light guide plate 70 is inclined, the paths of light beams are made shorter than in the case without slant surfaces, as a result of which a luminance increase of 4% to 5%, for example, can be realized.

Also in the third embodiment, the arrangement space of the circuit board 11 for driving the liquid crystal cell 8 and the light source devices 15 can be secured without degrading the optical characteristics such as luminance and luminance uniformity of a side light type back light unit 68. The liquid crystal module 67 can thus be reduced in thickness.

While certain embodiments have been described, these embodiments have been presented by way of example only, and are not intended to limit the scope of the invention. Indeed, the novel apparatus described herein may be embodied in a variety of other forms; furthermore, various omissions, substitutions and changes in the form of the apparatus, described herein may be made without departing from the sprit of the invention. The accompanying claims and their equivalents are intended to cover such forms or modifications as would fall within the scope and sprit of the invention.

What is claimed is:

1. A liquid crystal display device comprising:
   a transmissive liquid crystal cell having a substantially rectangular, flat-plate-like external shape;
   a plurality of light source devices in which a plurality of light-emitting elements are arranged in rows; and
   a light guide plate having a substantially rectangular, flat-plate-like external shape, the light guide plate including
      a first surface configured being opposed to a rear surface of the liquid crystal cell and having a planar shape,
      a second surface configured being disposed on an opposite side to the first surface and including a first slant surface portion and a second slant surface portion being respectively inclined from a first short side and a second short side in directions toward an approximately central portion of the first surface so as to decrease in thickness,
      a first light input portion at a side surface of the first short side of the light guide plate, and
      a second light input portion at a side surface of the second short side of the light guide plate, light beams emitted from one or more of the plurality of the light source devices entering the light guide plate through the first light input portion or the second light input portion;
   an electronic component being mounted on a surface of a circuit board and the circuit board is at least partially positioned within both a first area formed under the first slant surface portion inclined from the first short side and a second area formed under the second slant surface portion inclined from the second short side, the electronic component being disposed between the surface of the circuit board and the first and second slant surface portions; and
   a holding member including third and fourth slant surface portions being in close contact with the first and second slant surface portions of the light guide plate, respectively, the holding member being disposed between the light guide plate and the electronic component, the holding member configured to hold the light guide plate and reflect light from the light source devices in directions toward the first surface.

2. The liquid crystal display device of claim 1, wherein the first slant surface and the second slant surface are connected to each other smoothly by a connection portion having a circular arc shape in section.

3. The liquid crystal display device of claim 1, wherein the electronic component is configured to drive the liquid crystal cell.

4. The liquid crystal display device of claim 3, wherein the electronic component is configured to further drive the plurality of light source devices.

5. The liquid crystal display device of claim 1, wherein the electronic component is configured to drive the plurality of light source devices.

6. The liquid crystal display device of claim 1, the holding member extend through positions behind the plurality of light source devices.

7. The liquid crystal display device of claim 6, further comprising a frame attached to the holding member, wherein the plurality of light source devices are attached to the frame.

8. A liquid crystal display device comprising:
   a transmissive liquid crystal cell having a substantially rectangular, flat-plate-like external shape;
   a plurality of light source devices in which a plurality of light-emitting elements are arranged in rows; and
   a light guide plate having a substantially rectangular, flat-plate-like external shape, the light guide plate including
      a first surface configured being opposed to a rear surface of the liquid crystal cell and having a planar shape, and
      a second surface configured being disposed on an opposite side to the first surface and including a first slant surface portion and a second slant surface portion being respectively inclined from a first short side and a second short side of the light guide plate in directions toward an approximately central portion of the first surface so as to decrease in thickness;

an electronic component being mounted on a surface of a circuit board and the circuit board is at least partially positioned within both a first area formed under the first slant surface portion inclined from the first short side and a second area formed under the second slant surface portion inclined from the second short side, the electronic component being disposed between the surface of the circuit board and the first and second slant surface portion; and a holding member including third and fourth slant surface portions being in close contact with the first and second slant surface portions of the light guide plate, respectively, the holding member being disposed between the light guide plate and the electronic component, the holding member configured to hold the light guide plate and reflect light from the light source devices in directions toward the first surface.

9. The liquid crystal display device of claim 8, wherein the first slant surface and the second slant surface are connected to each other smoothly by a connection portion having a circular arc shape in section.

10. The liquid crystal display device of claim 8, wherein the electronic component is configured to drive the liquid crystal cell.

11. The liquid crystal display device of claim 10, wherein the electronic component is configured to further drive the plurality of light source devices.

12. The liquid crystal display device of claim 8, wherein the electronic component is configured to drive the plurality of light source devices.

13. The liquid crystal display device of claim 8, the holding member extend through positions behind the light source devices.

14. The liquid crystal display device of claim 13, further comprising a frame attached to the holding member, wherein the light source devices are attached to the frame.

15. A liquid crystal display device comprising:
a transmissive liquid crystal cell having a substantially rectangular, flat-plate-like external shape;
a plurality of light source devices in which a plurality of light-emitting elements are arranged in rows; and
a light guide plate having a substantially rectangular, flat-plate-like external shape and adapted to receive light beams from the plurality of light source devices, the light guide plate including
a first surface configured being opposed to a rear surface of the liquid crystal cell and having a planar shape,
a second surface configured being disposed on an opposite side to the first surface and having
first and second slant surface portions having substantially triangular shapes and being respectively inclined from first and second short sides in directions toward an approximately central portion of the first surface so as to decrease in thickness, and
third and fourth slant surface portions having substantially triangular shapes and being respectively inclined from first and second long sides in directions toward an approximately central portion of the first surface so as to decrease in thickness;
an electronic component being mounted on a surface of a circuit board and the circuit board is at least partially positioned within each of (i) a first area formed under the first slant surface portion inclined from the first short side to the central portion, (ii) a second area formed under the second slant surface portion inclined from the second short side to the central portion, (iii) a third area formed under the first slant surface portion inclined from the first long side to the central portion, (iv) a fourth area formed under the second slant surface portion inclined from the second long side to the central portion, the electronic component being disposed between the surface of the circuit board and the first to fourth slant surface portions; and a holding member including fifth, sixth, seventh, and eighth slant surface portions being in close contact with the first, second, third and fourth slant surface portions of the light guide plate, respectively, the holding member being disposed between the light guide plate and the electronic component, the holding member configured to hold the light guide plate and reflect light from the light source devices in directions toward the first surface.

16. The liquid crystal display device of claim 15, wherein
the first slant surface and the third slant surface are connected to each other smoothly by a first connection portion having a circular arc shape in section,
the first slant surface and the fourth slant surface are connected to each other smoothly by a second connection portion having a circular arc shape in section,
the second slant surface and the third slant surface are connected to each other smoothly by a third connection portion having a circular arc shape in section, and
the second slant surface and the fourth slant surface are connected to each other smoothly by a fourth connection portion having a circular arc shape in section.

17. The liquid crystal display device of claim 15, wherein the electronic component is configured to drive the liquid crystal cell.

18. The liquid crystal display device of claim 17, wherein the electronic component is configured to further drive the plurality of light source devices.

19. The liquid crystal display device of claim 15, wherein the electronic component is configured to drive the plurality of light source devices.

20. The liquid crystal display device of claim 15, the holding member extend through positions behind the light source devices.

21. The liquid crystal display device of claim 20, further comprising a frame attached to the holding member, wherein the light source devices are attached to the frame.

22. A liquid crystal display device comprising:
a transmissive liquid crystal cell having a substantially rectangular, flat-plate-like external shape;
a plurality of light source devices in which a plurality of light-emitting elements are arranged in rows; and
a light guide plate having a substantially rectangular, flat-plate-like external shape, the light guide plate including
a first surface configured being opposed to a rear surface of the liquid crystal cell and having a planar shape,
a second surface configured being disposed on an opposite side to the first surface and having a first slant surface portion and a second slant surface portion being respectively inclined from a first short side and a second short side of the light guide plate in directions toward a central portion of the first surface so as to decrease in thickness,
a first light input portion at a side surface of the first short side of the light guide plate, and
a second light input portion at a side surface of the second short side of the light guide plate, light beams emitted from one or more of the plurality of the light source devices entering the light guide plate through the first light input portion or the second light input portion;

an electronic component being mounted on a surface of a circuit board and the circuit board is at least partially positioned within both a first area formed under the first slant surface portion inclined from the first short side and a second area formed under the second slant surface portion inclined from the second short side, the electronic component being disposed between the surface of the circuit board and the first and second slant surface portions; and a holding member including third and fourth slant surface portions being in close contact with the first and second slant surface portions of the light guide plate, respectively, the holding member being disposed between the light guide plate and the electronic component, the holding member configured to hold the light guide plate and reflect light from the light source devices in directions toward the first surface.

* * * * *